June 30, 1942.                J. KARMAZIN                2,288,094
                        METHOD OF MAKING TUBING
                          Filed Jan. 28, 1939

INVENTOR.
John Karmazin
BY Spencer, Hardman & Fehr
ATTORNEYS

Patented June 30, 1942

2,288,094

UNITED STATES PATENT OFFICE 2,288,094

METHOD OF MAKING TUBING

John Karmazin, Grosse Ile, Mich., assignor to General Motors Corporation, Dayton, Ohio, a corporation of Delaware Application January 28, 1939, Serial No. 253,392

1 Claim. (Cl. 113—35)

This invention relates to refrigerating apparatus or the like; more particularly, it refers to the manufacture of tubing which may be used for refrigerating apparatus and for other purposes.

This application is a continuation in part of my copending application Serial No. 73,258 filed April 8, 1936, now Patent No. 2,154,942.

An object of this invention is to provide a method of manufacturing tubing in which costs have been reduced materially and in which the seam of the tube may be welded without danger of causing the material to puddle within the tube.

In constructing tubing it is desirable to have a smooth outer surface as well as a smooth inner surface. One object of this invention, therefore, is to construct the tubing in such a manner as to avoid uneven surfaces in the finished product.

Further objects and advantages of the present invention will be apparent from the following description, reference being had to the accompanying drawing, wherein a preferred form of the present invention is clearly shown.

Figure 1:
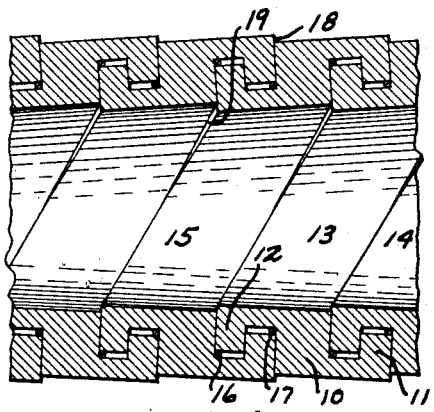
Fig. 1 is a longitudinal cross-sectional view showing one embodiment of a tube partially manufactured.
Figure 2:
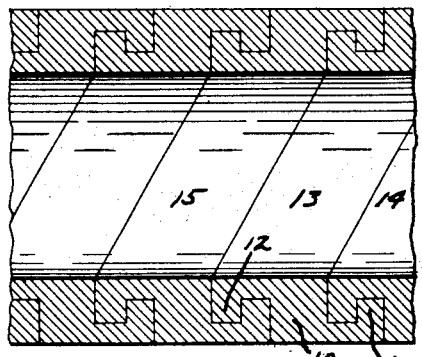
Fig. 2 shows the tube of Fig. 1 in its completed form.

In practicing this invention, a strip of metal is extruded or otherwise formed with flanged edges. In the modification shown in Figs. 1 and 2, this metal strip 10 is formed with flanged edges 11 and 12. This metal strip is wound so that the edges 11 and 12 of one loop 13 lock with the adjacent edges of the adjacent loops 14 and 15, this locking arrangement extending continuously throughout the length of the tube at all of the loops of the tube. Bonding material is placed between the interlocked edges of the loops. Preferably, this is accomplished by simultaneously winding one or more wires 16, 17 of bonding material while the metal strip 10 is being wound. If the metal strip 10 is made of steel, the wires 16 and 17 preferably are of copper or of a copper alloy. After the tube is thus wound, the edges of the loops are rolled, or otherwise forced together, to flatten out the wires 16 and 17 and reduce the corners 18 and 19 substantially to a smooth finish. Thereafter, the tube is heated in a reducing atmosphere, such as hydrogen, at a sufficient temperature to cause the bonding material of the wires 16 and 17 to flow throughout the seam and to weld the tube completely. Thereafter the tube is cooled in the reducing atmosphere. The heating and cooling of the tube preferably is performed in a furnace through which the tube is passed.

Figure 3:
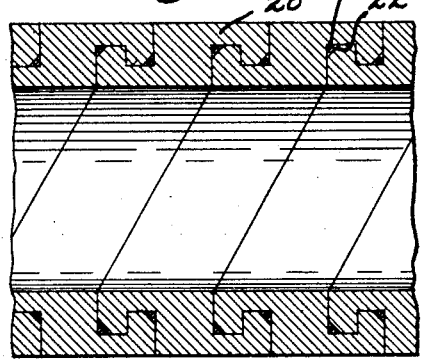
Fig. 3 is a view similar to Fig. 1 and shows a modification of the tubing partially manufactured.

In the modification shown in Fig. 3 the metal strip 20 has been formed with flanged edges of such a shape that when the strip is wound into tube formation cavities 22 are formed into which the bonding material 24 may be placed. Inasmuch as the strip 20 is preformed so as to provide the cavities 22, it is not necessary to deform the strip during the winding operation in order to insert bonding material into the seam. Preferably, the bonding material is wound into the seam at the time when the strip 20 is wound into tube formation. With this arrangement the bonding material does not prevent the interlocking edges of the seam coming together completely prior to the heating operation. For purposes of illustration, the cavities 22 have been shown of rectangular cross-sectional shape. However, the particular shape and number of the cavities as well as the shape of the bonding material may be varied.

Figure 4:
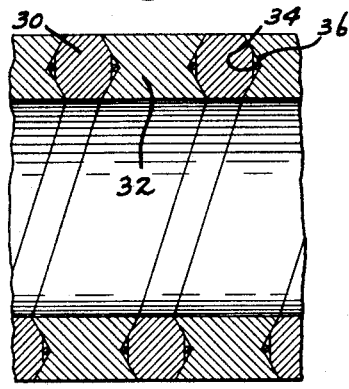
Fig. 4 is a view similar to Fig. 3 showing a still different modification.

In the modification shown in Fig. 4 a plurality of wires or strips 30 and 32 are wound into spiral form. As shown, the individual wires may have different cross sections in the same tube. Thus, the one wire 30 may be substantially octagonal in cross section and the adjacent wire 32 may be of a shape to fit between adjacent loops of the octagonal wire. Strips of bonding material 34 are wound into the cavities 36 which are formed between the strips 30 and 32. By virtue of the shapes of the wires 30 and 32 there is very little tendency on the part of the wires to become disarranged prior to the bonding operation, and as in the modification shown in Fig. 3 the bonding material is securely held in place in the preformed recess or cavity 36.

Figure 5:
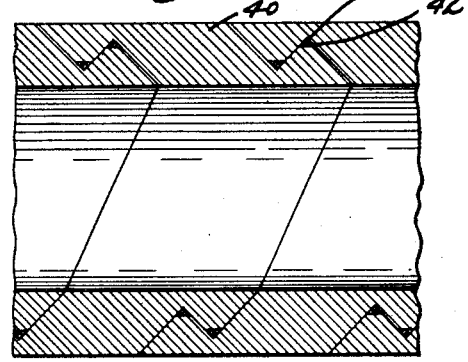
Fig. 5 is a view similar to Fig. 3 also showing a further modification.

In Fig. 5 I have shown an arrangement very similar to the arrangement shown in Fig. 3 except for the shape of the interlocking edges. As shown in Fig. 3 the strip 40 is provided with interlocking edges of such a shape as to leave cavities 42 in which strips of bonding material 44 may be wound. While I have shown two cavities, it is obvious that the number of cavities provided may be varied depending upon the particular material being used, etc.

Figure 6:
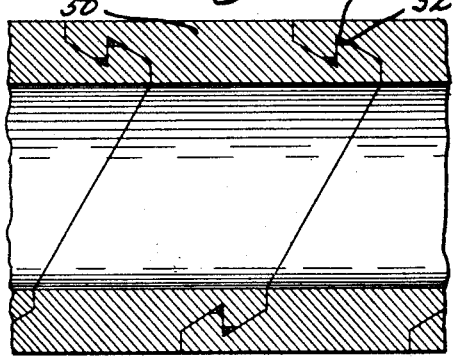
Fig. 6 is a view similar to Fig. 5 showing a slightly different modification.

In Fig. 6 I have shown a modification somewhat similar to the modification shown in Fig. 5. In this modification the edges of the strip 50 interlock in such a manner as to provide a cavity 52 in which bonding material 54 may be placed.

Figure 7:
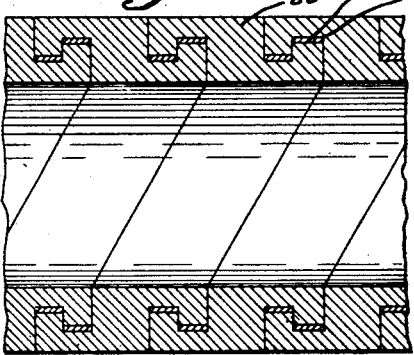
Fig. 7 is a view similar to Fig. 3 showing a slightly modified arrangement in which the bonding material is in ribbon formation.

In each of the above described modifications the bonding material has been shown in round wire formation. However, bonding material in the shape of a flat ribbon may be used. In Fig. 7 I have shown tubing especially designed to employ bonding material in ribbon formation. In this modification the strip 60 is provided with interlocking edges which when brought together leave rectangular-shaped cavities 62 in which strips of bonding material 64 may be wound simultaneously with the winding of the strip 60.

The heating of the tubes shown in the various modifications is preferably carried on in a reducing atmosphere and at a temperature to cause the bonding material to flow but at a temperature sufficiently low not to affect the main body of the tube. If desired, the tubing may also be cooled in the reducing atmosphere subsequent to the heating operation. During the heating operation the bonding material distributes itself throughout the full length of the seam and completely bonds the seam without causing any puddling within the tube or outside of the tube. By virtue of my improved method of manufacture and improved design, tubing of very uniform diameter may be formed. The tubing thus formed also has a very smooth and uniform internal surface as well as external surface.

While the form of embodiment of the invention as herein disclosed, constitutes a preferred form, it is to be understood that other forms might be adopted, all coming within the scope of the claim which follows.

What is claimed is as follows:

The method of manufacturing tubing having substantially smooth inner and outer surfaces which comprises forming a metal strip with opposed complementary edges reduced so that the sum of the thickness of the two edges substantially equals the thickness of the main part of the strip, and having complementary ridges and grooves on said edges, forming one ridge smaller than its cooperating groove to provide a recess when said complementary edges are overlapped, spirally winding said strip to overlap said complementary edges and simultaneously placing bonding material into said recess, and thereafter subjecting said assembly to a high temperature so as to bond said overlapping edges.

JOHN KARMAZIN.